Patented Sept. 16, 1941

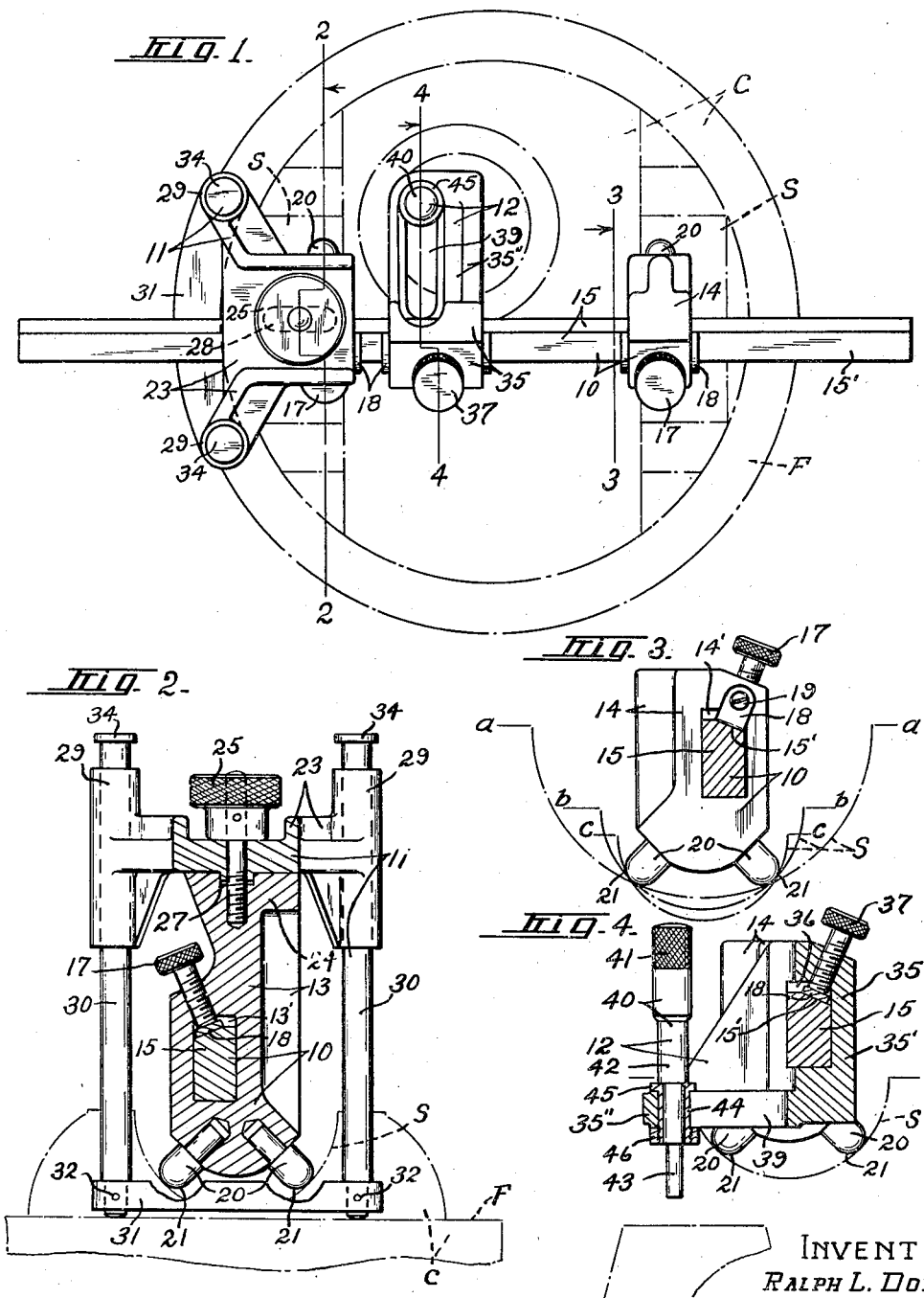

2,255,996

UNITED STATES PATENT OFFICE 2,255,996

GEAR SETTING GAUGE

Ralph L. Dodge, Syracuse, and Fay F. Adkinson, De Witt, N. Y., assignors to New Process Gear Corporation, Syracuse, N. Y., a corporation of Delaware Application March 25, 1940, Serial No. 325,818

18 Claims. (Cl. 33—181)

This invention relates to an improved gear setting instrument and pertains more particularly to a gauge for determining and checking the correct settings of the pinions of differential gearings associated with the drive axles of automobiles, trucks or the like.

As is well known, drive pinions of differential gearings are often adjusted accurately with respect to the ring gears by means of shims. In replacing the drive pinions of such differential gearings, it is customary to first remove the old differential assembly from its housing, after which a new drive pinion is mounted in the differential carrier before assembling the pinion with the ring gear of the differential. The shims for positioning and maintaining the pinion in proper running relation with the ring gear are in some structures mounted on the pinion shaft between a rolling bearing carried by said shaft and the pinion when said bearing is positioned adjacent said pinion. In other structures, where the rolling bearing is mounted in more or less spaced relation to the pinion, the shims are positioned between said bearing and a shoulder provided on the differential carrier.

The primary object of this invention is to produce an improved gauge for determining the exact position of the drive pinions in differential gearings with respect to the ring gears prior to the mounting of the pinions in the carriers or cases therefor so that the thickness of the shims to be used may be readily calculated before assembling.

Another important object is to provide a gauge which is adapted to be used without change or use of accessories or additional parts with all differential units regardless of variations in the bearing sizes or of changes in bearing sizes which may be produced from time to time, as when developing new models.

A more specific object of the invention is to provide a gauge for determining the correct setting of pinions of differential assemblies which is adapted to be used in connection with pinions of the common bevel class positioned on center as well as those offset as in hypoid construction.

Another object of the invention is to provide a gauge which is adapted to measure the distance from the axis of rotation of the ring gear of a differential assembly to the rolling bearing engaged by the shims for positioning the drive pinion as well as from said axis to the head of the pinion gear.

A further object of the invention resides in providing a gear setting instrument or gauge of the above mentioned character which is composed of a minimum number of separate or auxiliary parts, is durable and economical in construction and which is accurate and simple in use.

We attain these objects by mechanism illustrated in the accompanying drawing, in which:

Figure 1 is a top plan view of a gear setting instrument or gauge constructed in accordance with this invention and showing the same mounted in cooperative relation with a carrier for a differential drive pinion and ring gear of the hypoid type.

Figures 2, 3 and 4 are vertical sectional views taken, respectively, on lines 2—2, 3—3 and 4—4 of Figure 1.

The measuring instrument or gauge of this invention, as shown in the drawing, comprises primarily a supporting structure 10 adapted to engage in the semi-circular side bearing seats provided in the differential carrier; a leveling or truing instrument 11 connected with the support 10 and adapted to contact with the rim of the differential carrier for maintaining the supporting structure in predetermined parallel relation with the axis of rotation of the pinion gear; and a measuring instrument 12 mounted on the support for engagement with the head of the drive pinion or with the end surface of a bearing member engaged by the shims for positioning said pinion with respect to the ring gear of the differential.

The supporting structure 10 is composed of two end or locating members 13 and 14 which are adjustably secured together by a tie bar 15. The bar 15 is preferably rectangular in cross section and may be of any desired length depending upon the distance between the side bearing seats, as S, of the differential carrier C. The bar 15 is preferably composed of tempered steel ground to a predetermined size and is mounted in corresponding rectangular openings or apertures 13' and 14' provided in the end members 13 and 14, respectively. The bar has an easy sliding fit in the apertures 13' and 14' and is adjustably clamped to the end members by screws 17. The screws 17 are preferably arranged to extend into the apertures 13' and 14' in angular relation thereto, as indicated in Figures 2 and 3 so as to urge the bar 15 toward the bottom and one side of the recesses 13' and 14' to thereby uniformly clamp the bar to the end members and always maintain the bar and end members in predetermined operative relation to each other.

In order that the screws 17 may firmly engage the upper edge of the bar 15, said bar may be beveled, as at 15', adjacent the screws 17. In order that the screws will not mutilate the beveled edge 15' of the bar, I have provided each post with a pressure clip 18. These clips are of angular construction and have one leg thereof secured to the corresponding end member as by a screw 19 while the other leg of the member extends over the adjacent beveled portion of the bar intermediate a corresponding clamping screw and the bar.

Each of the end members 13 and 14 is provided with a pair of contact elements 20 which, in this instance, are in the form of shouldered pins or studs. These contact pins or studs are arranged, in this instance, to extend outwardly from the lower ends of the end members at substantially 45° to each other and in a plane extending transversely through the tie bar 15 for contacting circumferentially spaced portions of a corresponding bearing seat S of the differential carrier C. The lower or outer ends of the contact elements 20 are preferably formed substantially semi-spherical, as at 21, so as to uniformly contact bearing seats S of different radii, as indicated by broken lines $a-a$, $b-b$ and $c-c$, Figure 3. In other words, the contact elements are adapted to engage all bearing seats of differential gearings irrespective of the degree of curvature of the seats and, at the same time, provide for a uniform distance from the apex of the angle defined by a pair of contact elements to the points of contact of said elements with the bearing seat.

It will now be understood that, inasmuch as the tie bar 15 is always positioned in predetermined relation with the end members when clamped thereto by the screws 17, the distance from said tie bar to the apex of the angle formed by each pair of contact elements and, therefore, to the point of contact of said elements with the bearing seat will always be uniform.

The hereinbefore mentioned locating or truing instrument 11 is adapted to maintain the end members 13 and 14 and bar 15 in a predetermined position with respect to the bearing seats against rocking movement relative to said seats. That is, the leveling or truing instrument is for the purpose of maintaining the end members in such a position that the apices of the angles defined by the contact elements 20 will lie in the plane bisecting the semi-circular bearing seats engaged by said contact elements or, in other words, so that the contact elements of each pair are positioned equal distances at either side of said plane. This leveling or truing instrument comprises a head 23 which is adjustably secured to an extension 24 provided at the upper end of one of the end members, as 13, of the supporting structure by a clamping screw 25.

The head 23 and end member extension 24 may, as shown in Figure 4, be provided with a tongue and groove 27 at their adjacent surfaces for maintaining said members in sliding relation with each other. The screw 25 preferably extends downwardly through an elongated opening 28 provided in the head 23 so as to permit a limited amount of adjustment of the head with respect to the end member in a direction longitudinally of the tie bar 15 for adapting the device to different sizes and structures of differential carriers. The head 23 is provided with a pair of vertically disposed hollow bosses 29 arranged at opposite sides of the end member 13 and spaced outwardly therefrom. Slidably mounted in the bosses 29 is a pair of contact posts or rods 30 which are adapted to extend downwardly from the head 23 and contact with a surface of the carrier adjacent the bearing seat engaged by the contact elements of the head 13, such as the rim F of the carrier, as indicated in Figure 2.

The lower ends of the rods 30 are secured together by a tie plate 31 which receives the lower ends of the rods therethrough and is connected to said rods as by pins or screws 32. The plate 31 is so connected to the rods 30 that said lower ends of the rods project a short distance below the plate to freely contact the surface F of the carrier. The plate 31 is preferably curved outwardly, as indicated in Figure 1, so as to more or less conform to the curvature of the carrier flange F and thereby eliminate the possibility of said plate contacting with an adjacent portion of the carrier and interfering with the contact of the rods with said carrier. The upper ends of the rods may, as indicated in Figure 2, be provided with heads 34 of greater diameter than the openings through the bosses 29 for limiting the downward movement of said rods with respect to the head 23.

It will now be obvious that inasmuch as the rods 30 have a free sliding fit in the bosses 29, said rods may freely contact with the upper surface of the flange F as the contact elements 20 are brought into engagement with bearing seats S and that contact of rods 30 with said flange F assists in maintaining the supporting structure in such a position that the apex of the angle defined by each pair of contact elements 20 will lie in the plane passing longitudinally through the bearing seats in bisecting relation therewith.

The measuring instrument 12, as shown, comprises a supporting bracket 35 of substantially L formation in cross section. This bracket is provided with a rectangular opening 36 in one leg 35' thereof which is adapted to slidably receive the tie bar 15 therethrough. A clamping screw 37, secured to the bracket 35, is adapted to engage the tie bar 15 for clamping said bracket to said bar. The screw 37, like the clamping screws 17, is arranged in angular relation with respect to the opening 36 so as to engage the bevel edge 15' of the bar and insure uniform positioning of the bracket 35 with respect to the tie bar. The other leg 35'' of the bracket 35 extends outwardly from the leg 35' so as to lie at one side of the bar 15 in right angular relation thereto. The leg 35'' is provided with an elongated slot 39 extending longitudinally therethrough and which adjustably receives a measuring gauge 40 therethrough. The measuring gauge 40 is of usual micrometer depth gauge construction and comprises a head 41, a barrel 42 and a spindle 43. The gauge 40 is mounted in a supporting or holding sleeve 44 which receives the lower end of the barrel 42 therethrough. The sleeve 44 is adjustably clamped to the bracket leg 35'' by means of a head 45 provided at one end of the sleeve and a nut 46 screw-threaded on the other end of the sleeve and which receive the leg 35'' between them.

In operation, the differential gearing is first removed from the housing as hereinbefore indicated and then our novel gauge is brought into engagement with the differential carrier, as shown in Figures 1, 2 and 3 of the drawing, to determine the correct mounting of the drive pinion in the carrier to maintain said pinion in proper running relation with the ring gear of the differential. When the supporting structure 10 is brought into operative engagement with the differential carrier the contact elements 20 rest in the semicircular bearing seats S of the side bearings of the differential. At the same time, rods 80 of the leveling instrument engage a suitable surface of the carrier arranged in fixed predetermined relation with respect to the bearing seats such as the flange F.

It will be observed that inasmuch as the upper or outer surface of flange F is formed parallel with the longitudinal axes of bearing seats S, the end members 13 and 14 will be positioned and maintained substantially centrally of the bearing seats while the tie bar 15 will extend parallel with the longitudinal axis of said seats. It will be also understood that any required adjustment of the end members 13 and 14 with respect to each other to permit the contact elements 20 to be brought into engagement with the bearing seats may be accomplished after loosening one or both of the clamping screws 17, while relative adjustment of the leveling instrument 11 with respect to the support 10 to cause said instrument to engage a surface of the carrier may be accomplished after loosening the clamping screw 25.

After the support 10 is thus positioned on the bearing seats, the measuring instrument 12 is adjusted to bring the micrometer spindle 43 in alignment with the inner end of the drive pinion or with a rolling bearing for said pinion that comes in contact with the shims. This adjustment of the measuring instrument is accomplished by moving the bracket 35 when necessary longitudinally of the bar 15 to bring the slot 39 over the bearing or pinion depending upon from which object the measurement is to be taken. The micrometer gauge 40 may next be adjusted if necessary longitudinally of the slot 39 toward or from the bar 15 to bring the spindle 43 into alignment with the object from which the measurement is to be taken.

After the measuring instrument has been adjusted and secured in the adjusted position by means of screws 37 and nut 46, the spindle 43 may be brought into engagement with the surface from which the measurement is to be taken by manipulation of the head 41 of the micrometer gauge in the usual manner. If, however, the longitudinal movement of the spindle 43 produced by turning the head 41 is insufficient to bring said spindle into engagement with the surface from which the measurement is to be taken, then an extension spindle of proper length may be utilized to obtain the desired measurement.

It will be observed that the coaction of the support 10 and leveling instrument 11, when engaged with a differential carrier, as C, in the manner above described, will maintain the micrometer spindle 43 in substantial parallel relation with the axis of rotation of the drive pinion of the differential. However, the distance from the contact end of the micrometer spindle 43, when the micrometer is set at zero, to the axis of the side bearings of the differential or rather to a plane passing through said axis of the side bearings normal to the axis of the micrometer spindle, will vary in differentials having bearings of different diameters. In order, therefore, that our gear setting gauge may be readily utilized for measuring the position of the drive pinion with respect to the axis of rotation of the ring gear in various models of differential gearing, we have provided a chart (not shown) which contains constants designating the distances from the axis of the side bearings to the end of the micrometer spindle when set at zero. It therefore follows that by adding to the measurement obtained by the micrometer the constant designated in the chart for the particular pinion used, the sum will be the distance from the axis of the side bearings and, therefore, of the ring gear to the surface measured. Other dimensions required may now be readily obtained by adding to or subtracting from this sum, as the case may require, other dimensions relating to the construction of the drive pinion or position of the bearing therefor. For instance, if the bearing for the drive pinion is mounted on the pinion shaft adjacent the pinion, the correct thickness of the shim to use may be calculated by first obtaining the distance from the axis of the ring gear of the differential to the face of the pinion bearing adjacent the pinion by the use of our gauge in the manner above described, after which the thickness of the shim may be obtained by subtracting from such dimension the sum obtained by adding to the axial length of the pinion head the proper distance the pinion is to be operated from the axis of the ring gear as marked on said pinion by the manufacturer.

It is thus seen that any required dimension with respect to the relation of the drive pinion to the axis of the pinion gear may readily be obtained by our novel gear setting gauge and although we have shown and particularly described the preferred embodiment of our invention, we do not wish to be limited to the exact construction shown as various changes, both in the form and relation of the parts thereof, may readily be made without departing from the spirit of the invention as set forth in the appended claims.

We claim:

1. An instrument of the character described comprising, in combination, a micrometer gauge, a supporting means, means operatively connecting the micrometer gauge to the supporting means with the spindle of said gauge arranged to extend in predetermined relation therewith, a positioning means operatively connected to said supporting means, said supporting means and said positioning means including contact elements adapted to engage a first surface having a curved contour and a second surface having a contour distinguished from that of said first surface respectively, said contact elements being so constructed and arranged in fixed spaced relation with respect to each other both longitudinally and transversely of said first surface that when in said engagement with said surfaces the spindle of said gauge is maintained thereby with the axis thereof substantially coincidental with a line extending in a plane normal to the axis of curvature of the first surface and in predetermined angular relation with respect to said second surface.

2. An instrument as defined in claim 1 wherein the contact elements of the positioning means are mounted for movement as a unit with respect to the supporting means toward and from the second surface.

3. An instrument as defined in claim 1 wherein the contact elements of the supporting means are arranged in pairs with the contact elements of each pair adapted to engage circumferentially spaced portions only of the first surface, said latter contact elements being provided with spherical contact surfaces to adapt them for engagement with curved surfaces of different radii and to maintain the spindle of the gauge in uniform predetermined spaced relation with respect to the points of contact of said contact elements with all such surfaces.

4. An instrument as defined in claim 1 wherein the contact elements of the supporting means are arranged in pairs with the contact elements of each pair adapted to engage circumferentially spaced portions of the first surface, said latter contact elements being provided with spherical contact surfaces to adapt them for engagement with curved surfaces of different radii and to maintain the spindle of the gauge in uniform predetermined spaced relation with respect to the points of contact of said contact elements with such curved surfaces, and wherein the contact elements of the positioning means are mounted for movement with respect to the supporting means toward and from the second surface.

5. In an instrument of the class described for determining the setting of the drive pinions of differential gearings or the like, in combination, a micrometer gauge, a support, means fixedly connecting the micrometer gauge to said support with the spindle of said gauge arranged in predetermined relation therewith, a positioning means operatively connected to said support, said support and said positioning means including contact elements engageable with at least one of the bearing seats of a differential carrier and with a surface of said differential carrier spaced from said bearing seat respectively, said contact elements being so constructed and arranged in fixed spaced relation to each other axially of the first surface and at opposite sides of a plane passing through said axis normal to said second surface that when in said engagement with the differential carrier the spindle of the micrometer gauge is maintained with the axis thereof extending in substantially parallel relation with the axis of rotation of a drive pinion arranged in a plane intersecting and extending substantially normal to said axis of the bearing seat.

6. In an instrument of the class described for determining the setting of the drive pinions of differential gearings or the like, in combination, a micrometer gauge, a support operatively connected to said gauge including members adapted to contact the side bearing seats of a differential carrier and of such a character that the axis of the spindle of the micrometer gauge is maintained thereby extending in a direction substantially normal to the axes of said side bearing seats, positioning means including a head member and contact means connected with said head member adapted to have engagement with a surface of the differential carrier spaced from said side bearing seats to maintain said head member in predetermined fixed relation with respect to said surface, and means operatively connecting the head member to the supporting means in such a manner that the axis of the gauge spindle is maintained thereby in substantially parallel relation with the axis of rotation of a drive pinion operatively connected to said differential carrier.

7. An instrument as defined in claim 6 wherein the contact means is mounted in sliding relation with the head member for movement with respect to said head member toward and from the surface of the differential carrier engaged by said contact means.

8. In a gearing setting instrument of the character described, in combination, a micrometer gauge, a support for said gauge having contact elements fixedly connected thereto adapted to engage the side bearing seats of a differential carrier for maintaining said micrometer gauge in predetermined relation with the axes of said bearing seats, and positioning means including contact members adapted to engage spaced portions of a substantially flat surface of the differential carrier for maintaining the positioning means against lateral movement with respect to said surface, and means operatively connecting the positioning means to the support for maintaining the spindle of the micrometer gauge in a plane extending through the axes of said bearing seats substantially normal thereto.

9. In a gauge for determining the setting of the drive pinions of a differential gear or the like, in combination, a support comprising a pair of end members adapted to be received in side bearing seats of a differential carrier, two pairs of contact elements fixedly connected to the end members, the contact elements of each pair being adapted to engage circumferentially spaced portions only of the bearing seat for maintaining said end member in predetermined relation to the axis of said seat, a micrometer gauge, means operatively connecting the micrometer gauge to the support intermediate the end members whereby the spindle of said gauge is maintained in a plane extending through said bearing seat axis substantially normal thereto, and means connected to said support adapted to engage a surface of the differential carrier adjacent the bearing seats of such a character that the axis of the gauge spindle is maintained thereby substantially parallel with the axis of rotation of the drive pinion supported by the differential carrier.

10. In a gear setting gauge of the character described, in combination, a measuring instrument, a support therefor including end members, spaced contact elements connected in fixed relation to the end members adapted to engage the side bearing seats of a differential carrier, means including a tie member connecting said end members, means operatively connecting the measuring instrument to the tie member, and a positioning means connected to the support to move in conjunction therewith, said positioning means including a pair of contact members adapted to engage portions of a surface of the differential carrier having a contour distinguished from that of said seats at opposite sides of a plane passing through the axes of said bearing seats normal to said surface for maintaining the support and measuring instrument in predetermined angular relation with respect to said bearing seats.

11. In a gauge for differential gearings, in combination, a pair of standards adapted to be received in the side bearing seats of a differential carrier, means including a tie member maintaining the standards in predetermined spaced relation to each other, each of said standards having contact elements arranged in fixed predetermined relation therewith to engage circumferentially spaced portions only of the corresponding bearing seat for maintaining said tie member substantially parallel with the axes of said bearing seats, and positioning means secured to one of said standards to move in unison therewith, said positioning means including a pair of contact members arranged in a plane extending substantially parallel with the plane of the adjacent pair of the first mentioned contact elements for engaging a surface of the carrier having a contour distinguished from that of said seat for maintaining the standards in predetermined angular relation with respect to said bearing seats, a measuring instrument, and means operatively connecting said measuring instrument to said tie member.

12. A gauge as defined in claim 11 wherein the first mentioned contact elements have semispherical contact surfaces to cause the tie member to be maintained in uniform predetermined spaced relation with respect to the point of contact of said contact elements with bearing seats of different diameters.

13. In a gauge for determining the setting of the drive pinions of differential gearings, in combination, a support comprising a tie member, means connected with said tie member including contact elements adapted to engage the side bearing seats of a differential carrier for maintaining the tie member in substantially parallel relation with the axes of said seats, a micrometer gauge, means including relatively adjustable members connecting the gauge to the tie member of such a character that said gauge is movable toward and from the axes of said bearing seats in substantially normal relation with said axes, and positioning means connected to said support and including contact members engageable with spaced portion of a substantially flat surface of the carrier for maintaining the spindle of the micrometer gauge in predetermined angular relation with respect to said surface of the carrier.

14. A gauge as defined in claim 13 wherein the contact members of the positioning means are slidably mounted to move with respect to said support in a direction substantially normal to the tie member.

15. In an instrument of the character described comprising in combination, a micrometer gauge, supporting means operatively connected to the micrometer gauge to maintain the spindle of said gauge extending in predetermined relation therewith, a positioning means operatively connected to said supporting means, said supporting means and said positioning means including contact elements arranged in pairs for engagement with a first surface having a curved contour and a second surface having a contour distinguished from that of said first surface, respectively, the contact elements of each pair being arranged in spaced relation with respect to each other transversely of the first surface to engage spaced portions of the respective surfaces at opposite sides of a plane passing through the axis of curvature of said first surface substantially normal to the second surface so that the supporting means is maintained by the engagement of said contact elements with said surfaces against rocking and angular movement with respect to the first surface, whereby the spindle of said gauge is maintained with the axis thereof in a plane substantially normal to the axis of curvature of said first surface and in predetermined angular relation with respect to said second surface.

16. In an instrument of the character described comprising in combination, a micrometer gauge, supporting means operatively connected to the micrometer gauge to maintain the spindle of said gauge extending in predetermined relation therewith, a positioning means, said supporting means and said positioning means including contact elements arranged in pairs for engagement with a first surface having a curved contour and a second surface having a contour distinguished from that of said first surface respectively, the contact elements of each pair being fixed with respect to each other, the contact elements of the supporting means being arranged to engage spaced portions of the curved surface in such a manner that said supporting means is maintained against movement angularly with respect to the axis of curvature of said first surface, and means connecting the positioning means to the supporting means, whereby engagement of the contact elements of said positioning means with the second surface maintains said supporting means against rocking movement circumferentially of said first surface.

17. In an instrument of the character described comprising in combination, a micrometer gauge, a supporting means, a positioning means, said supporting means and said positioning means including contact elements arranged in pairs for engagement with a first surface having a curved contour and a second surface having contour distinguished from that of said first surface respectively, the contact elements of each pair being fixed in spaced relation with respect to each other, the contact elements associated with the support being arranged to engage axially spaced portions of the first surface to maintain said support in predetermined angularly relation with the axis of curvature thereof, means operatively connecting the positioning means to the supporting means in such a manner that the contact elements associated with said positioning means engage the second surface at opposite sides of a plane passing through the axis of the first surface normal to said second surface to maintain the supporting means against rocking movement circumferentially of said first surface, and means connecting the micrometer gauge to the supporting means with said gauge slidable and clampable in respect thereto, whereby the spindle of said gauge is maintained with the axis thereof extending in a plane substantially normal to the axis of curvature of said first surface and in predetermined angular relation with respect to said second surface.

18. A gear setting instrument of the character described comprising two pairs of laterally spaced contact elements; a support therefor maintaining said elements in said spaced relation and the elements of each pair disposed in angular relation with respect to each other for contacting circumferentially spaced portions of a pair of axially disposed bearing seats; a third pair of contact elements connected in fixed spaced relation to each other; means operatively connecting the third pair of contact elements with said support to maintain the latter elements in spaced relation with respect to the first mentioned pairs of contact elements for engagement with a substantially flat surface adjacent the bearing seats, said connecting means being of such a character that the plane of contact of the first mentioned elements with the bearing seats is maintained in the same angular relation with respect to the plane of contact of the third pair of contact elements with said flat surface as said latter plane bears to the axis of a second bearing seat extending substantially normal to the axis of the first mentioned bearing seats; a micrometer gauge; and means connecting the micrometer gauge to the support with the spindle of said gauge disposed in substantially normal relation with respect to said plane of contact of said first mentioned elements with said pair of bearing seats.

RALPH L. DODGE.
FAY F. ADKINSON.